United States Patent [19]

Freerksen

[11] Patent Number: 4,975,868
[45] Date of Patent: Dec. 4, 1990

[54] FLOATING-POINT PROCESSOR HAVING PRE-ADJUSTED EXPONENT BIAS FOR MULTIPLICATION AND DIVISION

[75] Inventor: Donald L. Freerksen, Rochester, Minn.

[73] Assignee: International Business Machines Corporation, Armonk, N.Y.

[21] Appl. No.: 339,279

[22] Filed: Apr. 17, 1989

[51] Int. Cl.⁵ .............................................. G06F 7/38
[52] U.S. Cl. .................................................. 364/748
[58] Field of Search ................... 364/748, 715.04, 745, 364/754, 761

[56] References Cited

U.S. PATENT DOCUMENTS 4,366,548 12/1982 Kregness et al. ................... 364/748
4,528,640 7/1985 Criswell .............................. 364/748
4,823,260 4/1989 Imel et al. ........................... 364/748

Primary Examiner—Dale M. Shaw
Assistant Examiner—Long T. Nguyen
Attorney, Agent, or Firm—J. Michael Anglin

[57] ABSTRACT

A floating-point arithmetic unit includes an exponent unit for biased exponents. Combinatorial bias-adjust logic removes the bias from one operand exponent before the two operand exponents are added together in adder for a multiply operation, and inserts a bias into one exponent before the exponents are subtracted by the adder for a divide operation.

11 Claims, 4 Drawing Sheets

FETCH CONTROL WORDS

BUS302 ---> FCFRAC REGISTER. (MULTIPLIER FRACTION)
    BUS302 ---> FAFRAC REGISTER. (MULTIPLICAND FRACTION)
    IF FAFRAC[51]=0:
        0 ---> FBFRAC REGISTER. (TEST LOW BIT)
    IF FAFRAC[51]=1:
        OP2 ---> FBFRAC REGISTER.
    BUS302 ---> FBEXP REGISTER ---> BIASADJ LOGIC.
    M/D BIT ---> SEL321, Cin (SUBTRACT BIAS)
    BUS302 ---> FAEXP REGISTER.

OPERATION SEQUENCER CYCLES #1 THROUGH #N

IF CYCLE IS #1:
        BIASADJ LOGIC ---> EXPADDER LEFT INPUT.
        FAEXP REGISTER ---> EXPADDER RIGHT INPUT.
        M/D BIT ---> SEL321 (ADD EXPONENTS)
        M/D BIT ---> EXPADDER Cin (ADD: BIAS ADJUSTMENT)
        EXPADDER SUM ---> OVERUNDERFLOW DETECTOR
        EXPADDER SUM ---> FAEXP REGISTER.
    FBFRAC REGISTER ---> FRACADDER
    FCFRAC[0-2] ---> RECODE1 LOGIC ---> MSEL378 GATE.
    FCFRAC[2-4] ---> RECODE2 LOGIC ---> MSEL379 GATE.
    FBFRAC ---> MGEN LOGIC ---> FRACADDER[MSEL378]
    FBFRAC ---> MGEN LOGIC ---> FRACADDER[MSEL379]
    FRACADDER SUM ---> SHIFT4L ---> FBFRAC REGISTER.
    IF ZEROTEST:
        SET ALIGNER=N
    IF NOT ZEROTEST:
        SET ALIGNER=4
    FCFRAC REGISTER ---> ALIGNER ---> FCFRAC REGISTER.

IF CYCLE IS #N:
        FBFRAC REGISTER ---> NORM/ROUND LOGIC.
        NORM/ROUND LOGIC ---> EXPADDER (NORMALIZE)
        FAEXP REGISTER ---> EXPADDER
        EXPADDER SUM ---> FAEXP REGISTER

STORE CONTROL WORD

FAFRAC ---> BUS302
    FAEXP ---> BUS302

FIG. 4

FLOATING-POINT PROCESSOR HAVING PRE-ADJUSTED EXPONENT BIAS FOR MULTIPLICATION AND DIVISION

BACKGROUND OF THE INVENTION

The present invention relates to electronic data processing, and more particularly concerns a floating-point processor whose operands have exponent parts which are offset from their true values by a fixed bias.

Floating-point numbers are stored in computers as a fraction (or mantissa) part and an exponent part. Fractions most often have an associated sign bit to indicate whether the fraction is positive or negative. Exponents, on the other hand, are commonly represented as positive numbers only, even though the actual exponent value can be negative as well as positive. This is accomplished by adding a bias value to the true exponent value. For example, an 8-bit exponent field can represent actual exponent values of $-126$ to $+127$ by adding a bias of 127, yielding stored values $+2$ to $+253$. (The stored values 0, 1, 254, and 255 signify error conditions.)

Biased exponents, however, have a disadvantage for multiplication and division operations. Since the operand exponents must be added together for multiplication, the exponent of the result contains twice the bias, and another operation si required to subtract out the extra bias amount. In division, the operand exponents are subtracted; the result exponent then has no bias, and another operation is required to add the bias back in.

Heretofore, bias adjustments for multiplication and division have been performed with another trip through the same arithmetic unit used for adding or subtracting the operand exponents. For example, a multiplication operation may add the operand exponents from two registers in a first clock cycle, and store the sum in one of the registers. In a second clock cycle, the sum and a constant bias value are gated through the same adder, and stored again in one of the registers. Another technique is to provide two cascaded arithmetic units, which requires a slower cycle time to accommodate the longer data paths.

The most obvious disadvantage of these techniques is the extra time they require—substantially double the time required for unbiased exponents. This extra time becomes especially significant in floating-point processors which can skip over zeros in an operand, and thus terminate early. It is also significant in a multiprocessor setting, where exception conditions in the exponent of the result must be known before another processor can be allowed to proceed; see, for example, the commonly assigned application Ser. No. 339,285, filed Apr. 17, 1989 by T. J. Beacom, et al., entitled "Overlapped Execution of Sequential Instructions from a Common Stream in Multiple Processors."

Another penalty is that the data paths, registers, adders, etc., must have extra bit positions to handle the largest possible "real" biased sum, plus an extra bias amount. Where more than one adder is used, it may remain in the data path for other operations, such as rounding and operand loading, where it is not needed, thus slowing these operations as well; the alternative, switching out the extra adder, requires more gating logic, control signals, and some amount of time.

SUMMARY OF THE INVENTION

The present invention preserves the advantages of a biased-exponent floating-point processor by substantially eliminating the time and/or hardware penalties incurred during multiplication and division operations with this exponent representation.

The invention is able to adjust an exponent for a bias value with extremely little added hardware. The very small amount of additional delay appears only in the bias-adjustment path, and does not affect any other operations. The result exponent is available in a single cycle of the processor. No arithmetic addition operation is required in order to add or subtract the bias value during a multiply or divide operation. The maximum data width is not increased; it does not exceed that already required for the operand exponents and the conventional overflow and underflow bits.

Broadly speaking, the invention is an exponent unit for a floating-point processor including bias-adjustment logic in the data path between one of the operand exponent registers and the exponent adder. This logic is a simple combinatorial logic which operates only on the higher-order bits of one operand to perform an operation which is equivalent to an addition or subtraction of the bias quantity, either alone or in combination with the conventional exponent adder. THe same exponent unit, including the same combinatorial logic, can handle different precision levels or formats of operands.

Other objects and advantages of the invention, as well as modifications obvious to those skilled in the art, will appear from the following description of a preferred embodiment.

BRIEF DESCRIPTION OF THE DRAWING

FIG. 4 is a sequence diagram showing the operation of the coprocessor of FIG. 4 for a multiplication operation according to the invention.

DESCRIPTION OF A PREFERRED EMBODIMENT

Figure 1:
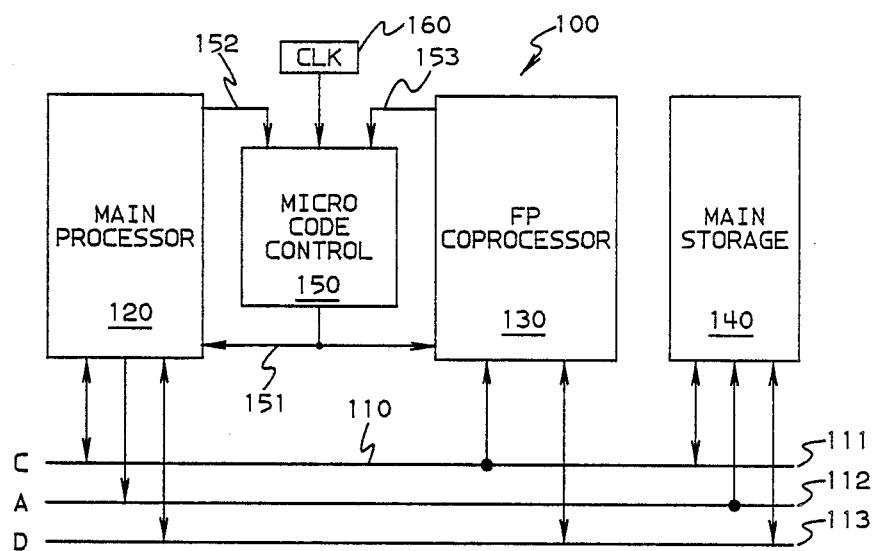
FIG. 1 is a high-level block diagram of a data-processing system serving as an environment for the present invention.

FIG. 1 shows a portion of a data-processing system 100 which may serve as an environment for the invention. Processor bus 110 interconnects a main processor 120, a floating-point coprocessor 130, and a main storage unit 140. The conventional bus 110 has parallel lines 111 for control, lines 112 for addresses, and lines 113 for data. In this implementation, coprocessor 130 does not drive the address lines 112. Main processor 120 controls the fetching of the operands it requires from main storage 140, and the storage of its results, via data lines 113.

A conventional microcode control unit 150 controls both of the processors 120 and 130. Unit 150 stores horizontal microcode words, each of which has fields for gating data paths, specifying operations, and so forth; these are transmitted over lines 151 to both of the processors. (Although not necessary to the invention, some of the fields could specify one action to main processor 120, and a different action to coprocessor 130. Another bit or field in the word determines which action is to be executed.) Each word also contains the address of the next microcode word to be executed. This address can be modified by certain conditions occurring in the processors; these conditions are transmitted to unit 150 over lines 152 and 153. Clock 160 drives unit 150 to fetch a new microcode word every cycle.

The blocks thus far described connect to other units, such as workstation adapters, bulk storage drives, and other input/output devices (not shown) to form a complete data-processing system. These connections may occur via bus 110 or by means of another bus or channel (not shown) attached to main processor 120.

Figure 2:
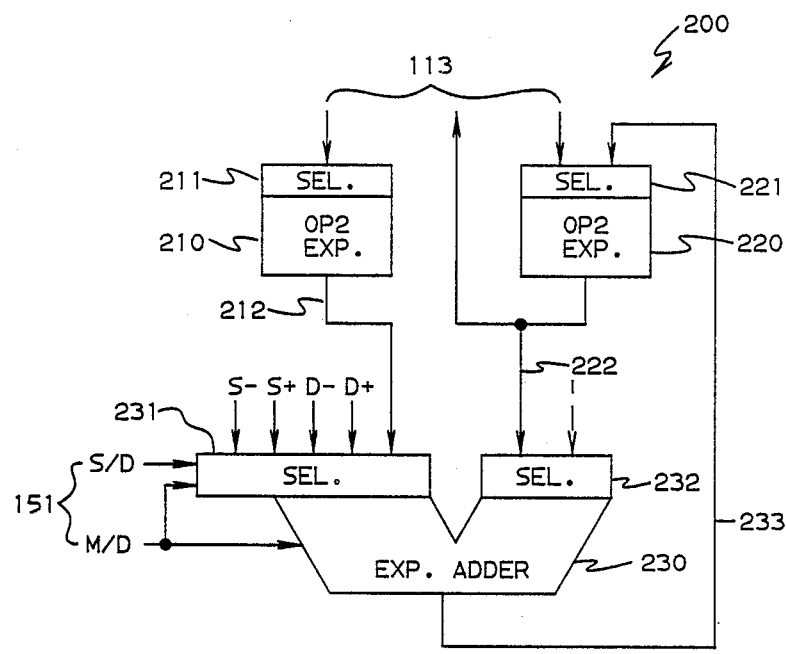
FIG. 2 is a simplified block diagram illustrating a floating-point multiplier/divider exponent subunit according to the prior art.

FIG. 2 illustrates a much simplified example of an exponent subunit 200 according to the prior art, for a coprocessor such as 130, FIG. 1. Register 210 receives a first operand OPI via selector (or gate, or multiplexer) 211 directly or indirectly from data lines 113. Register 220 receives a second operand OP2 via selector 221. An exponent adder 230 has one input controlled by selector 231 and another input controlled by selector 232. Microword control lines 151 gate one of five inputs of selector 231 into the adder, according to whether the operands are single or double precision (S/D), and whether the operation requested by the current instruction is multiply or divide (M/D). The M/D bit also determines whether adder 230 will add or subtract its two inputs. Selector 232 chooses between the output 222 and another source which is not relevant to the present explanation. Lines 222 also connect to data lines 113. The output 233 feeds back to selector 221.

Subunit 200 requires two microcode cycles to produce a result, after the operands have been loaded. Consider the example of a floating-point multiplication of two single-precision numbers, which requires the addition of their biased exponents. In the first cycle, selectors 231 and 232 feed OP1+BIAS, the contents of register 210, and OP2+BIAS, in register 220, to adder 230, which adds them together. Selector 221 gates the adder output 233 back into register 220. (These registers are built from conventional master/slave stages, which operate in two phases over a single cycle, so that they can both produce an output and receive an input in the same clock cycle.) At the end of the first cycle, register 220 holds the intermediate result techniques is the extra time they require-substantially OP1+OP2+2*BIAS. The fact that this number can be larger than any possible final result is another disadvantage of the prior art; the register and the adder require more stages. In the second cycle, lines 151 cause selector 231 to gate the negative of the single-precision bias (S−) into the first adder input, while selector 232 gates the intermediate result to the adder. The sum of these two quantities, OP1+OP2+BIAS, is gated back into register 220, and appears at output lines 222. The other three constants at selector 231, are used for single-precision division (S+), and double-precision multiplication (D−) and division (D+).

Figure 3:
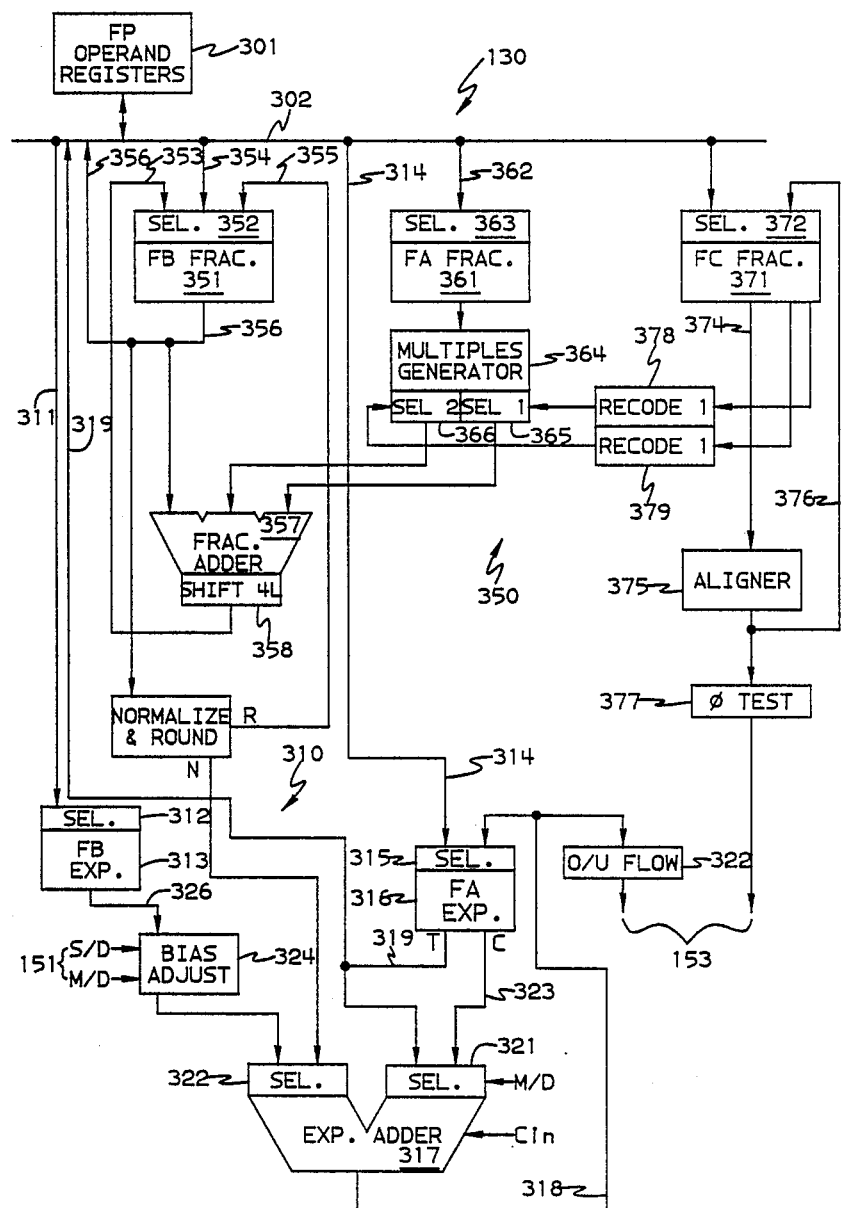
FIG. 3 is a block diagram of a complete floating-point coprocessor according to the invention.

FIG. 3 shows a floating-point coprocessor 130 according to the invention The various subunits will be characterized in the roles they assume during a multiplication operation; some of the blocks may function differently for other operations. Coprocessor 130 operates upon numbers in formats according to Draft 10.1 of the IEEE Task P754 Proposed Standard for Binary Floating-Point Arithmetic. The 4-byte single-precision format of this standard calls for a sign bit followed by an 8-bit exponent biased up by 127, followed by a 23-bit mantissa or fraction normalized to a value between (decimal) 1 and 2. Valid unbiased exponents range from −125 to +126 (1 to 254 when biased); values of −126 and +127 (0 and 255 when biased) represent underflow and overflow conditions, respectively. The 8-byte double-precision format has a sign bit, an 11-bit exponent biased up by 1023, and a 52-bit normalized fraction. In both formats, denormalized numbers have a biased exponent of binary 1, and at least one leading 0 in the fraction.

Coprocessor 130 has a transfer unit 300 for moving and storing operands, an exponent unit 310 for manipulating the operand exponents according to a desired operation, and a fraction unit 350 for manipulating operand fractions according to the selected operation. Routing of data through the various paths of coprocessor 130 is controlled by a conventional sequencer (not shown), which receives one control word per instruction from m control unit 150, FIG. 1, over lines 151. The sequencer transmits control signals to the other elements of the coprocessor during a number of cycles.

Transfer unit 300 receives operands from, and transmits operands to, data lines 113, FIG. 1. An instruction which specifies memory operands will read these operands from data lines 113, and may transmit a result directly back to main storage via lines 113. Because of the large size of floating-point operands, some instructions use a set of local 8-byte wide floating-point registers 301 for storing operands and/or results. An internal bus 302 carries operands from their source to the #units 310 and 350, and carries results from these units back to a destination, either registers 301 or lines 113. Registers 301 hold data on lines 113. Some coprocessor instructions perform no arithmetic operations at all, but merely transfer numbers between main storage and registers 301.

Exponent unit 310 receives the exponent fields of a first operand from bus 302 on lines 311. Selector or multiplexer 312 gates the bits of this field into FBEXP register 313. In the example of a multiplication operation, register 313 receives the biased exponent field of the multiplier, OP1+BIAS. Lines 314 transport the biased exponent field OP2+BIAS of a second operand (the multiplicand, in this example) to selector 315 for storage into FAEXP register 316. Selectors 312 and 315, like all the selectors in coprocessor 130, are controlled by bits in the microcode words emanating from control unit 150, FIG. 1; for clarity of exposition these lines are not generally shown in FIG. 3. Registers 313 and 316, like all other registers in the coprocessor, are conventional master/slave registers, which use a two-phase clock signal (not shown) for every microcode cycle. During the first phase, the output lines remain latched with the contents of the register, while the input lines receive new data into the register. At the beginning of the second phase, the data on the input lines are latched. At the end of the second phase, the latched input data appear at the output lines.

Exponent adder 317 is a conventional twos-complement carry-propagate adder for combining the exponent fields of the operands to produce a result on line 318. The adder adds its two inputs for a multiplication instruction, but subtracts them for division. Addition occurs when lines 319 are gated through selector 321 under the control of an M/D bit in lines 151. Register 316 also produces inverted outputs on lines 323. Subtraction occurs when selector 321 gates these ones-complement lines, and low-order carry-in bit C in is activated by the M/D bit. The result 318 is loaded back into register 316 via selector 315. Conventional overflow-/underflow detector 327 also receives the result, and produces signals on condition lines 153 for influencing controller 150, FIG. 1. Lines 319 also carry the contents of register 316 to internal bus 302 for transfer to the local operand registers or to main storage. Selector 322 can receive an output 328 from a normalize/round unit for normalizing the result exponent in a conventional manner. (A preferred normalize/round unit is shown in commonly assigned application Ser. No. 339,348, filed on 4/17/89 by Jeffrey Douglas Brown, et al. Docket No. R0989-00-3) Selector 322 may also gate the contents of register 313, after transformation by bias-adjust logic 324, over lines 325.

Bias-adjust logic 324 adds or subtracts one of two fixed bias amounts (decimal 127 or 1023) with the contents of register 313 on line 326. The bias amount depends upon the precision of the operands, carried by S/D line 151; the logic adds the bias for a division and subtracts it for a multiplication, as specified by M/D control line 151. Thus, for a multiplication, the exponent unit 310 performs the operation (OP1EXP+BIAS)+(OP2EXP+BIAS)−BIAS→ (RESEXP+BIAS) in a single cycle. For a division, the unit produces (OP1EXP+BIAS)−(OP2EXP+BIAS)-+BIAS→(RESEXP+BIAS) on lines 318 in a single microword cycle. Subtraction is accomplished by ones-complement addition with a carry bit, as described above.

Logic 324 could be a conventional carry-propagate or other adder circuit. However, the properties of the particular bias amounts in this embodiment allow the use of a considerably simpler and faster circuit. The purpose of logic 324 is to modify the quantity (OP1EXP+BIAS) stored in register 313 so that the exponent unit produces the overall result of the above equations. The following tables show how this can be accomplished by four combinatorial-logic functions, without performing any arithmetic operations at all in the bias-adjust logic. Two 3-input functions of the high order three bits on lines 326 serve for double-precision multiply and divide; two 6-input functions of the high-order six bits on these lines handle single-precision. The symbol 'X' indicates a don't-care bit. The symbol '−' indicates that an input combination is not possible. The quantity Cin is a conventional low-order carry-in bit to adder 317. Note that, for twos-complement arithmetic, A−B=A+not(B)+1.

For double precision arithmetic, the range of valid exponents requires 11-bit binary numbers. Unit 130, however, uses 13-bit operands used for exponents. The high-order bit, Bit(0), is an underflow bit. That is Bit(0)=1 in the result indicates that the result is negative; but, since exponents are biased so as to produce only positive sums, the result is actually too small to represent as an 11-bit number. The next high-order bit, Bit(1), is an overflow bit. When the result has Bit(0:1)=01, the result is too large to represent as an 11-bit quantity. The third high-order bit, Bit(2), is the actual high-order bit of the 11-bit result. Note that some combinations of these three bits are logically impossible. For single-precision arithmetic, the range of valid exponents requires 8-bit numbers. Exponent unit 130 uses 13-bit numbers for these as well. The high-order bit is still the underflow bit, but the overflow bit is now Bit(4). The high-order bit of the actual result is now Bit(5).

| Double-Precision operands |
|---|
| Multiplication Equations: (RESEXP+BIAS) |
| = (OP1EXP+BIAS) + (OP2EXP+BIAS) − B'0001111111111' |
| = (OP1EXP+BIAS) + (OP2EXP+BIAS) − B'0010000000000' + B'0000000000001' |
| = (OP1EXP+BIAS) + (OP2EXP+BIAS) − B'0010000000000' + Cin |
| Division Equations: (RESEXP+BIAS) |
| = (OP1EXP+BIAS) − (OP2EXP+BIAS) + B'0001111111111' |
| = (OP1EXP+BIAS) − (not(OP2EXP+BIAS)+Cin) + B'0001111111111' |
| = (OP1EXP+BIAS) − (not(OP2EXP+BIAS)+Cin) + B'0010000000000' − B'0000000000001' |
| = (OP1EXP+BIAS) − (not(OP2EXP+BIAS)+Cin) + B'0010000000000' − Cin |
| = (OP1EXP+BIAS) − not(OP2EXP+BIAS) + B'0010000000000' |

| Logic functions: | Input | Multiply | Divide |
|---|---|---|---|
| | 000 | 111 | 001 |
| | 001 | 000 | 010 |
| | 01X | − | − |
| | 10X | − | − |
| | 110 | − | − |
| | 111 | 110 | 000 |

| Single-Precision operands |
|---|
| Multiplication Equations: (RESEXP+BIAS) |
| = (OP1EXP+BIAS) + (OP2EXP+BIAS) − B'0000001111111' |
| = (OP1EXP+BIAS) + (OP2EXP+BIAS) − B'0000010000000' + B'0000000000001' |
| = (OP1EXP+BIAS) + (OP2EXP+BIAS) − B'0000010000000' + Cin |
| Division Equations: (RESEXP+BIAS) |
| = (OP1EXP+BIAS) − (OP2EXP+BIAS) + B'0000001111111' |
| = (OP1EXP+BIAS) + (not(OP2EXP+BIAS)+Cin) + B'0000001111111' |
| = (OP1EXP+BIAS) + (not(OP2EXP+BIAS)+Cin) + B'0000010000000' − B'0000000000001' |
| = (OP1EXP+BIAS) + (not(OP2EXP+BIAS)+Cin) + B'0000010000000' − Cin |
| = (OP1EXP+BIAS) + not(OP2EXP+BIAS) + B'0000010000000' |

| Logic functions: | Input | Multiply | Divide |
|---|---|---|---|
| | 000000 | 111111 | 000001 |
| | 000001 | 000000 | 000010 |
| | 001XXX | − | − |
| | 011XXX | − | − |
| | 100XXX | − | − |
| | 101XXX | − | − |
| | 110XXX | − | − |

| | | |
|---|---|---|
| 1110XX | — | — |
| 11110X | — | — |
| 111110 | — | — |
| 111111 | 111110 | 000000 |

The above functions may easily be realized by a read-only memory array, programmable logic array, or other conventional means having inputs for the six high-order bits and selector lines for multiply-divide and single/-double precision, and outputs for the six high-order bits.

Fraction unit 350 manipulates the fraction or mantissa of the floating-point operands in accordance with the operation selected by the current instruction. This unit is not a part of the present invention, and may function in any convenient manner. The components of unit 350 will be described using a multiplication operation as an example. Unit 350 employs a recording algorithm which retires four bits of the multiplier in each microcode cycle.

FBFRAC register 351 holds intermediate partial products and the final product of a multiplication. Microcode control lines gate one of four inputs into register 351 through selector 352. Lines 353 carry partial products at the end of each clock cycle. Lines 354 can receive the multiplicand operand directly from bus 302. Lines 355 receive the final rounded and normalized product. Finally, the selector can be turned off, so that an all-zero input reaches the register. Register output lines 356 return this result to bus 302, and also transmit the partial products to one input of fraction adder 357. Shifter 358 connects the output bits of the adder to lines 353 so as to achieve a four-bit shift to the left. Preferably, shifter 358 is merely a displacement in the wiring connections of four bit positions.

FAFRAC register 361 holds the multiplicand operand, loaded from bus 302 through lines 362 when a microcode word activates selector 363. The output of this register is always presented to multiples generator 364. Generator 364 is a conventional combinatorial circuit which produces four simultaneous multiples of the contents of register 361; these multiples are $-4$, $-2$, $0, +2$, and $+4$. They are available at the output of a selector 365 for transfer on lines 367 to another input of adder 357. The multiples are also available shifted two bits to the left (i.e., as $-16$, $-4$, $0, +4$, and $+16$) at another selector 366, for transfer on lines 368 to a third input of the fraction adder.

FCFRAC register 371 holds the multiplier operand, gated through selector 372 from lines 373, ultimately from bus 302. The output of this register, on lines 374 communicates with aligner 375. The aligner shifts the multiplier four bits right after every microcode cycle, then gates the shifted multiplier on lines 376 back into register 371 via selector 372. (Logic gates are used here to achieve the shift, because they are necessary for other operations.) Lines 376 also connect to detector 377, which senses the presence of large groups of zeros and activates a line 153 to cause aligner 375 to shift over the entire group for the next cycle.

Recode logic 378 connects to the low-order three bits of register 371, and produces a two-bit output for controlling selector 365 to determine which unshifted multiple from generator is sent to adder 357. An identical recode logic 379 connects to the third, fourth, and fifth low-order bits of register 371, and produces a two-bit output for controlling selector 366 to determine which shifted multiple from generator is sent to adder 357.

Diagrammatically, the recode logics look at the following bits of the multiplier (represented by Xs) during the first two cycles of the sequencer:

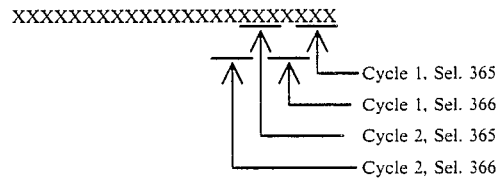

Both recording logics are identical, and may be in the form of a very small read-only storage or logic array. Because of the two-bit left shift into selector 366, the multiple on lines 368 is four times the corresponding multiple on lines 367. The mapping of the recording logics is as follows:

| Multiplier bits (High, Mid, Low) | Unshifted Multiple | Shifted Multiple |
|---|---|---|
| 000 | 0 | 0 |
| 001 | +2 | +8 |
| 010 | +2 | +8 |
| 011 | +4 | +16 |
| 100 | −4 | −16 |
| 101 | −2 | −8 |
| 110 | −2 | −8 |
| 111 | 0 | 0 |

This recording by itself cannot provide for the case where the least significant bit of the multiplier is a 1, that is, where the multiplier is an odd number. In this case, multiplicand is initially gated into register 351, via lines 354, at the same time it is gated into register 371 via lines 373. This creates an initial partial product of one times the multiplicand. For an even multiplicand, selector 352 is turned off when register 372 initially loads the multiplicand, so that the initial partial product is zero.

During each clock cycle, then, each recording logic looks at three bits of the multiplier, and both logics together look at five multiplier bits, in order to increase the partial product by an amount represented by four multiplier bits. In the succeeding cycle, the low-order bit investigated is the same as the high-order bit from the previous cycle.

Fraction adder 357 adds together three operands simultaneously to produce a single output, which is then left-shifted and returned on lines 353 to partial-product register 351, all in a single clock cycle. To accomplish this, adder 357 may comprise a conventional carry-save adder, (not shown) which accepts three inputs (lines 357, 367, and 368) and produces two intermediate outputs. A conventional carry-propagate adder (not shown) combines these two intermediate outputs into a final result which, shifted left four places, appears on lines 353.

FIG. 4 shows a sequence of operations for carrying out a complete multiplication operation. First, one or more conventional FETCH control words from controller 150 obtains the operands from main storage or FP registers over bus 302. Then an OPERATION control word starts the sequencer at a point appropriate for the multiply operation. The sequencer 380 then executes a number of operation cycles. For multiplication, each operation cycle processes four bits of the multiplier, so that a single-precision multiply requires six cycles, while a double-precision multiply requires thirteen. (Preferably, large groups of contiguous zeros are skipped in a single cycle by aligner 375; the details of this are not relevant here.) Note especially that exponent sums are completed during the first Operation cycle, thus allowing early detection of exponent exceptions and early termination for small multipliers. Additional details concerning the functions of the sequencer may be found in the aforementioned Beacom et al. application concerning overlapped execution.

We claim as our invention:

1. A floating-point arithmetic processor for performing multiply and divide operations upon first and second operands each having a fraction part and an exponent part, said exponent part of each operand having a bias offset, said arithmetic unit comprising:
   a multiply/divide signal for selecting one of said operations;
   a fraction unit for executing said multiply and divide operations upon said fraction parts so as to produce a fraction part of a result;
   a first exponent register for holding the exponent part of said first operand;
   a second exponent register for holding the exponent part of said second operand;
   bias-adjust means coupled to said second exponent register and responsive to said multiply/divide signal for selectively removing said bias offset from and including said bias offset in said second operand so as to produce an adjusted operand exponent;
   an exponent adder, separate from and coupled to said bias-adjust means, coupled to said first register and responsive to said multiply/divide signal, for selectively adding and subtracting said adjusted operand exponent and the exponent of said first operand so as to produce a result exponent having the same bias offset as the exponent parts of said first and second operands;
   means for storing said result exponent.

2. The processor of claim 1, wherein the means for storing said result exponent is said first exponent register.

3. The processor of claim 2, wherein said fraction unit includes normalize/round logic, and wherein said exponent adder has a first input coupled to said first exponent register and a second input selectively coupled to said bias-adjust means and to said normalize/round logic.

4. The processor of claim 2, wherein said first exponent register includes selector means for gating the exponent of said first operand and the exponent of said result into said first exponent register.

5. The processor of claim 1, wherein said first exponent register produces said first exponent part in both true and complemented forms, and wherein said exponent adder has an input for selectively gating said true and complement forms in response to said multiply/divide signal.

6. The processor of claim 5, wherein said complement form is a ones-complement, and wherein said exponent adder includes a low-order carry input responsive to said multiply/divide signal.

7. The processor of claim 1, wherein said first exponent part has a predetermined number of individual bits, and wherein said bias-adjust means is a combinatorial logic circuit responsive to fewer than all of said bits.

8. The processor of claim 7, wherein said combinatorial logic circuit is responsive to a high-order set of said bits.

9. The processor of claim 7, wherein said first exponent part has an underflow bit, an overflow bit, and a high-order significant bit, and wherein said combinatorial logic circuit is responsive to at least said three last-named bits.

10. The processor of claim 7, wherein said exponent adder includes a low-order carry input responsive to said multiply/divide signal.

11. The processor of claim 10, wherein said first exponent register produces said first exponent part in both true and ones-complement forms, and wherein said exponent adder has an input for selectively gating said true and ones-complement forms in response to said multiply/divide signal.

* * * * *